(12) United States Patent
McLear

(10) Patent No.: US 11,100,740 B2
(45) Date of Patent: *Aug. 24, 2021

(54) WEARABLE DATA TRANSMISSION DEVICE AND METHOD

(71) Applicant: McLEAR LIMITED, London (GB)

(72) Inventor: Edward John McLear, Bradford (GB)

(73) Assignee: MCLEAR LIMITED, Richmond (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,786

(22) Filed: Feb. 3, 2020

(65) Prior Publication Data

US 2020/0349788 A1     Nov. 5, 2020

Related U.S. Application Data

(63) Continuation of application No. 15/795,950, filed on Oct. 27, 2017, now Pat. No. 10,553,048, which is a continuation of application No. 14/319,151, filed on Jun. 30, 2014, now Pat. No. 9,805,530.

(60) Provisional application No. 61/863,141, filed on Aug. 7, 2013.

(51) Int. Cl.
| | |
|---|---|
| G07C 9/28 | (2020.01) |
| H04B 1/3827 | (2015.01) |
| G06F 21/00 | (2013.01) |
| G06K 19/04 | (2006.01) |
| G06K 19/077 | (2006.01) |
| G07C 9/22 | (2020.01) |
| H04M 1/72412 | (2021.01) |

(52) U.S. Cl.
CPC ............... *G07C 9/28* (2020.01); *G06F 21/00* (2013.01); *G06K 19/04* (2013.01); *G06K 19/07762* (2013.01); *G06K 19/07766* (2013.01); *G07C 9/22* (2020.01); *H04B 1/385* (2013.01); *H04B 2001/3861* (2013.01); *H04M 1/72412* (2021.01)

(58) Field of Classification Search
CPC . G07C 9/28; G07C 9/22; H04B 1/385; H04B 2001/3861; H04M 1/7253; G06F 21/00; G06K 19/04; G06K 19/07762; G06K 19/07766

See application file for complete search history.

(56) References Cited

U.S. PATENT DOCUMENTS

| | | | | |
|---|---|---|---|---|
| 9,460,573 | B1* | 10/2016 | Cordes | G06K 7/10138 |
| 2006/0059367 | A1* | 3/2006 | Yarvis | G07C 9/28 713/189 |
| 2006/0152366 | A1* | 7/2006 | Sironi | G06K 19/07798 340/572.1 |
| 2010/0116365 | A1* | 5/2010 | McCarty | F16K 37/00 137/554 |
| 2010/0257473 | A1* | 10/2010 | Kang | H04M 1/7253 715/769 |
| 2011/0282785 | A1* | 11/2011 | Chin | G06F 21/32 705/42 |

* cited by examiner

*Primary Examiner* — Mohamed Barakat

(74) *Attorney, Agent, or Firm* — Fox Rothschild LLP

(57) ABSTRACT

The present disclosure relates to a wearable radio device for access control. The radio device has an inside portion and an outside portion. The inside portion includes a first transponder and a second transponder. A first barrier is located between the first transponder and the second transponder. A second barrier is located between the first transponder and the second transponder in an outside portion of the wearable device.

14 Claims, 8 Drawing Sheets

WEARABLE DATA TRANSMISSION DEVICE AND METHOD

RELATED APPLICATIONS

The present patent document claims the benefit of the filing date under 35 U.S.C. § 119(e) of Provisional U.S. Patent Application Ser. No. 61/863,141 filed Aug. 7, 2013, which is hereby incorporated by reference.

BACKGROUND OF THE INVENTION

Field of the Invention

The present disclosure relates generally to security devices and methods, and more particularly, to cell phone and digital door lock communication. A wearable device transfers information/data and/or provides access control to limited access areas and/or data.

Description of Related Art

Standard door keys are frequently lost and can be difficult to operate if one struggles with physical motor control. Traditional door lock and access control technologies lack reliability, security and simplicity. Traditional door locks have many major faults. For example, a) it is incredibly easy to replicate a key and to use that on a current door lock, b) traditional door keys are cumbersome and often uncomfortable to keep on your person, c) if you lose your traditional door key it is necessary to change the entire locking mechanism to ensure security.

While there are numerous iterations of access control tools from the traditional metal key to card keys and key fobs, such tools are prone to being lost or misplaced. Traditional keys including the examples above have several major faults. They can be easily replicated, easily misplaced or lost, and are cumbersome to store on your person. In the case of metal keys, other accessories they are stored with may be scratched or otherwise harmed. If a traditional key is lost, misplaced or stolen, it is often a security necessity to change the entire locking mechanism.

SUMMARY OF THE INVENTION

The present disclosure relates to a wearable accessory that utilizes a radio frequency (RF) tag to perform the transfer of information between digital devices. A wearable accessory may also function as an access control mechanism for digital locks.

In accordance with the present disclosure, wearable radio devices may be used for gaining access to secured locations. In one example, the present disclosure provides an apparatus and method for public and private transponder access through a wearable device such as a ring.

Furthermore, the use of radio frequency identification tags inlaid within a wearable accessory that has distinct public and private functions which allow the wearer to share or transfer information as well as provide access control to digital locks.

In one example, the present disclosure relates to a wearable radio device for access control. In one embodiment, the radio device has an inside portion and an outside portion. The inside portion may include a first transponder and a second transponder. A first barrier is located between the first transponder and the second transponder. A second barrier is located between the first transponder and the second transponder in an outside portion of the wearable device.

In another embodiment, an apparatus for access control including a ring and a digital lock is disclosed. The ring may include a private component and a public component, an RFID public transponder located inside the ring, an RFID private transponder located inside the ring, an inner barrier located on an inner layer of the ring between the public transponder and the private transponder, an outer barrier on an outside layer of the ring between the public transponder and the private transponder and a first hand gesture and a second hand gesture. The ring may be configured to unlock the digital lock. A first hand gesture may be used for access to the public transponder and a second hand gesture is used for access to the private transponder.

In another embodiment, a Smartphone system is disclosed. The Smartphone system includes a processor and a memory for communicating with a wearable device comprising, an action generator operating on the Smartphone system and configured to write a plurality of actions to a public transponder and a private transponder, a scanning component operating on the action generator and configured to scan a QR code from a web application and write an action. The scanning component writes the action to the wearable device.

It should be noted that this disclosure is not limited to accessories worn but includes other embodiments including clothing, accessories such as handbags, for example, transient accessories, or any item having the potential to become wearable technology. Thus, all embodiments that use the concepts disclosed herein are also included.

BRIEF DESCRIPTION OF THE DRAWINGS (NON-LIMITING EMBODIMENTS OF THE DISCLOSURE)

DETAILED DESCRIPTION OF THE DRAWINGS AND THE PRESENTLY PREFERRED EMBODIMENTS

Figure 1:
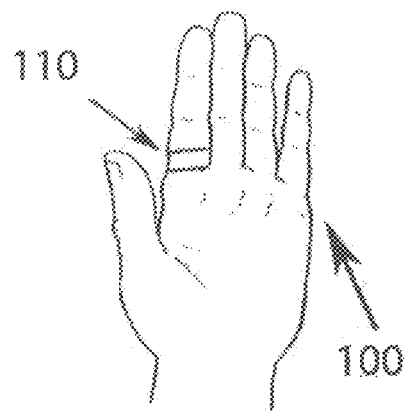
FIG. 1 illustrates a Back View of a private gesture (open palmed) for providing access to private data transmitted from a wearable device in the form of a ring, in accordance with an embodiment of the present invention.

Reference will now be made to the accompanying drawings, which form a part hereof, and which show, by way of illustration, specific exemplary embodiments. The principles described herein may, however, be embodied in many different forms. The components in the figures are not necessarily to scale, emphasis instead being placed upon illustrating the principles of the invention. Moreover, in the figures, like referenced numerals may be placed to designate corresponding parts throughout the different views.

Wearing this device provides the wearer with a "key" that is always available and extremely difficult to lose. However, if the device is lost, access may be immediately removed through configuration such as configuring the master system (i.e. a system capable of communicating with the wearable device) such as a Smartphone, computer, a device with a processor and a memory, etc. Additionally, if security is breached, the wearable device may be reset or reconfigured with new/different access configuration. For example. A wearable device 110 (shown as a ring) may require no charge so it is completely sustainable. Traditional door lock and access control technology lack this reliability, security and simplicity. In a version, the wearable device 110 interacts with a digital door lock 120 (target) providing an unlock mechanism. In another version, the wearable device may be used to unlock a cell phone or other portable device by holding one's hand under a section of their electronic device (target) the wearer is able to unlock their electronic device and gain access without any requirements of additional authentication mechanisms.

Common technical tasks such as providing WIFI information, Universal Resource Locators ("URLs"), GeoLocation and other social media is often a problematic task that requires a form of communication that is more often than not, a third party service such as e-mail. This disclosure is intended to resolve this issue, among others, by providing a simple mechanism to sham data "over the air."

To accomplish these tasks the wearer utilizes a specific location on the target device defined as a ("Sweet spot"). Utilizing a sweet spot provides a different mechanism for sharing data as the user has to be in touch distance of the target device. Common sharing methods such as WIFI/UHF RFID are capable of reading the data from distant places. In one example, the "Sweet Spot" approach means the wearer must have the device properly oriented and be within a <10 mm range.

In one embodiment, the wearer is able to easily tap their device to a specific surface area on the target device where the device will create induction ("Sweet Spot") on a Near Field Communication ("NFC") enabled cell phone or tablet device ("target"). Upon tapping, the target device is notified and takes actions that are target device specific. This "Sweet Spot" is preferably limited to an area where the wearers hand is not usually placed during standard use such as in the middle of a cell phone. This is to prevent unexpected induction and communication. The "Sweet Spot" can be identified and located by a "Sweet Spot" sticker for example. If a device is held up to a target device's "Sweet Spot" then coupling occurs and the communication process begins. A target device manufacturer may decide where the "Sweet Spot" is located during target device antenna design: the wearer locates the "Sweet Spot" and uses the "Sweet Spot" when using the device. The "Sweet Spot" will vary in size and shape depending on the antenna design implemented on the target device and the device worn by the wearer.

Private gestures are designed to be used in higher security applications such as authentication or any other situation that requires a higher level of security/screening, the device achieves this by ensuring the private portion of the device is difficult for a third party to access without the consent of the wearer. Public gestures are used in lower security applications such as sharing of non-sensitive information, the public portion of the device is designed to be relatively easy for a third party to access.

Referring now to FIG. 1, an exemplary back view of a private gesture (open palmed) for providing access to private data transmitted from a wearable device in the form of a ring is illustrated. A device 110 functions in accordance with a private gesture 100 for transferring data or the exchange of private/secure information in combination with target device 120 (shown in FIG. 2). As described herein, this combination may be configured by a user of device 110. In FIG. 1, the device 110 may be worn on any finger or on the wrist.

In an embodiment, the wearable ring communicates with NFC Enabled devices such as digital door locks, cell phones and tablet computers and can be used for several tasks. Each task has a different level of "security" depending on the wearer's preference. If a task is "high security" such as unlocking a door or providing other means of access control, it is likely that the wearer will choose to keep this task private. To accomplish privacy the wearer will write the "action" or assign the action to a bottom portion of the ring, or another portion of the ring designated for high security. This portion of the ring may be a smaller portion, the same size, or larger than other portions. In this case the bottom portion of the ring will be the "Private" portion and is worn at the bottom of the hand requiring an open hand gesture to share the information. An invention is "assigned" to a target device if the target device does not require an action to be written but instead pairs with the device through using the devices Unique Identifier ("ID") or Unique Text String Value. If a task is "low security" such as sharing a public social network address then the wearer may store this "action" on the "Public" portion of the device. The public portion of the device is frequently exposed to public viewing and can be accessed much easier. The hand gesture for sharing public information is to use a clenched fist and do a "punch" or "fist bump" style action.

Figure 4:
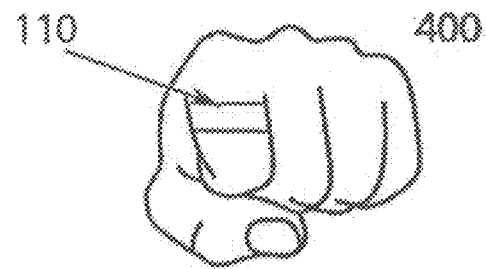
FIG. 4 illustrates a Back View of a public gesture (closed handed) for providing access to public data transmitted from one embodiment of a wearable device.

One example of the device will have two Radio Frequency Identifiers ("RFID") transponders with a standard of ISO14443A operating at a frequency of 13.56 Mhz. In this example, the transponders will conform to the NFC standard ergo including NFC Data Exchange Format ("NDEF") records that can be used to read/write data. Here, the read distance is preferably between 0 mm and 5 mm. The device will have to be touched on a specific portion of the target device. The ring will have a public and private portion. In one example, wearers will be able to write data to the public and private portions of the device using a cell phone application (FIG. 9) or NFC reader/writer. The application may be used on a number of mobile devices such as standard smart phones and tablets and can easily be modified to be compatible with new technologies. The application is not limited purely to mobile devices. Physical gestures may be used for data access. For example, wearers may use an open hand gesture to share private information (FIG. 1) and a closed hand gesture to share public information (FIG. 4).

The disclosure is not limited to physical gestures. Other options are also possible to share data/data access depending on the device and technologies available. In one embodiment of the device, two metal bands and a shielding layer (FIG. 7) act as shields between the public and private sections, these shields, serve the purpose of blocking any potential radio leaks and negate any induction from a target device trying to induct the metal at the core of the device. In other embodiments, materials other than metal may be appropriate. For example, ceramic may be used.

Figure 2:
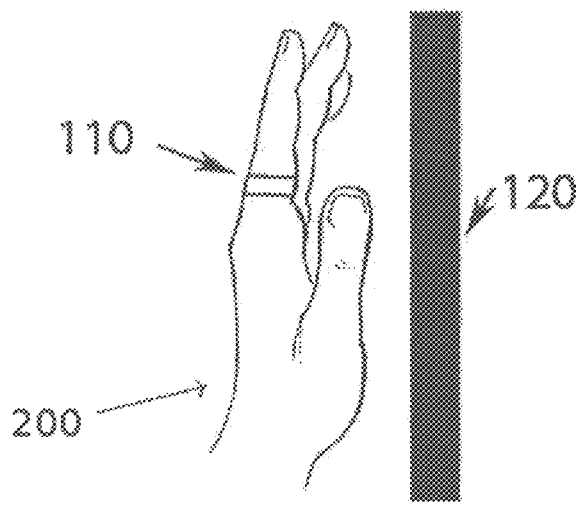
FIG. 2 illustrates a Side View of a private gesture (open palmed) interacting with a target device in accordance with an embodiment of the present invention.

FIG. 2 illustrates a Side View of a private gesture (open palmed/open hand) 200 for sharing private information, interacting with a target device 120. The open palm gesture 200 allows access to the private portion of the device 110. A target device 120 such as a digital door lock or cell phone could be unlocked using this gesture.

Figure 3:
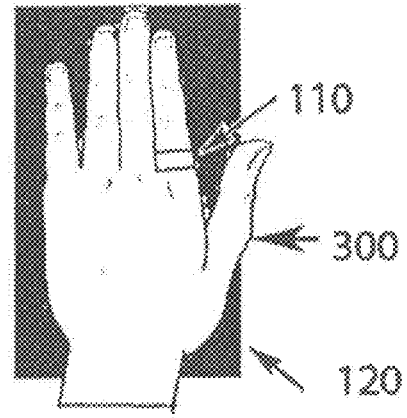
FIG. 3 illustrates a Front View of the embodiment of FIGS. 1 and 2.

FIG. 3 illustrates a front view of the embodiment of FIGS. 1 and 2; i.e. the open palm/hand gesture used for sharing private information. The open palm gesture 300 allows access to the private portion of the device 110. A target device 120 such as a digital door lock or cell phone could be unlocked using this gesture.

FIG. 4 illustrates a back view of a public gesture 400 (closed handed) for providing access to public data transmitted from the wearable device. In this example, the public gesture 400 used for sharing public information is a clenched fist. A fist bump, pump or touch gesture is when a wearer clenches their fist, holds their extended arm at shoulder height and projects the public portion of their device at a target device. In one example, a closed hand, fist bump, pump or touch gesture allows access to the public portion of the device 110. A target device 120 such as a cell phone, laptop or tablet would use the device to access information such as a URL, WIFI key, Latitude/Longitude etc.

Figure 5:
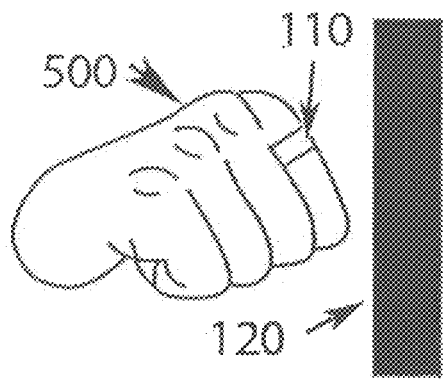
FIG. 5 illustrates a Side View of a public gesture interacting with a target device of FIG. 4.

FIG. 5 illustrates a Side View of a public gesture 500 interacting with the target device of FIG. 4. Here, the side view of the closed hand/clenched first gesture is used for sharing Public information. The closed hand, fist bump, pump or touch gesture allows access to the public portion of the device 110. A target device 120 such as a cell phone, laptop or tablet would use the device to access information such as a URL, WIFI key, Latitude/Longitude etc.

Figure 6:
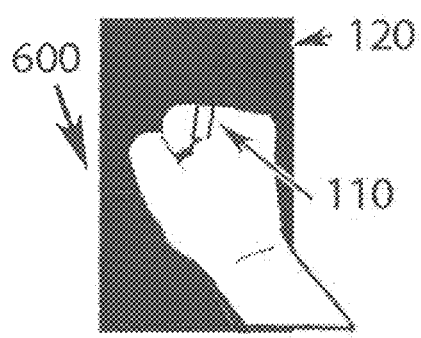
FIG. 6 illustrates a Front View of a public gesture of FIGS. 4 and 5.

FIG. 6 illustrates a Front View of a public gesture (illustrated by a clenched fist gesture) of FIGS. 4 and 5. In this example, the Closed hand/clenched fist gesture 500 is used for sharing Public information. The closed hand, fist bump, pump or touch gesture 500 allows access to the public portion of the device 110. A target device 120 such as a cell phone, laptop or tablet would use the device to access information such as a URL, WIFI key, Latitude/Longitude etc.

Figure 7:
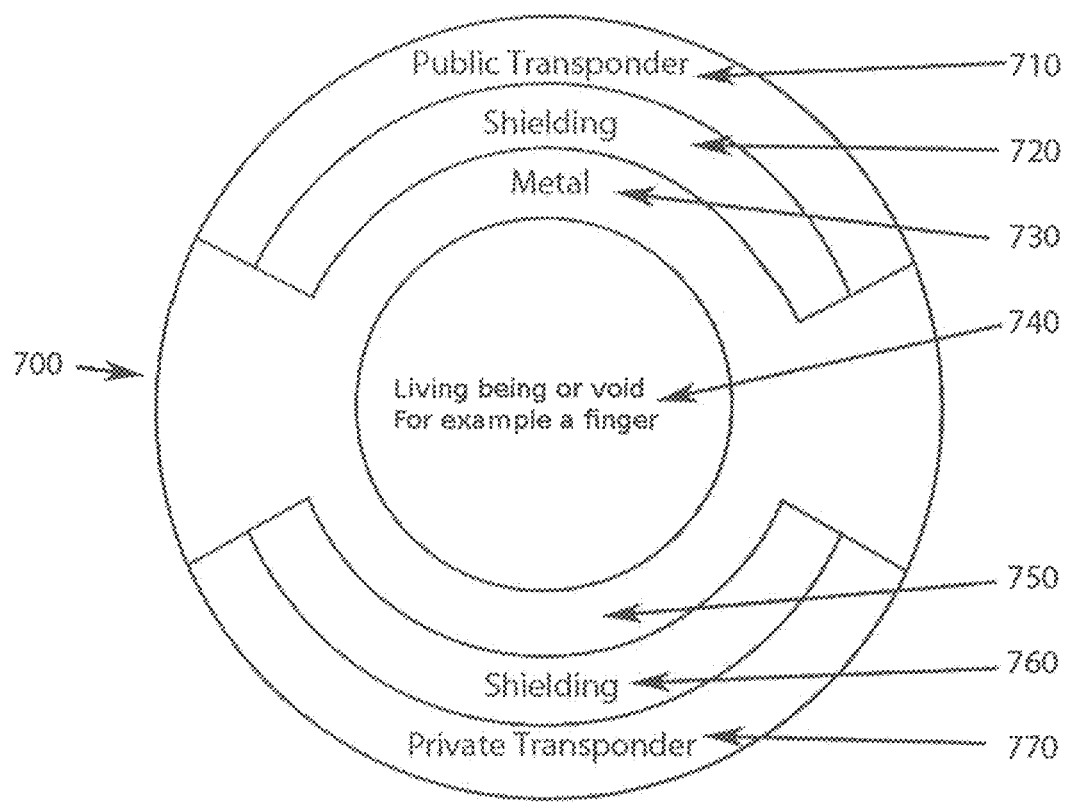
FIG. 7 is a front view illustration of an embodiment of internal components of a wearable device in the form of a ring that communicates access data.

FIG. 7 is a front view illustration of an embodiment of the internal components 700 of one example of a wearable device in the form of a ring that communicates access data. The internal components 700 include public transponder 710, shielding material 720 and 760, metal 730 and 750, and private transponder 770. The shielding material may be flexible graphite or polymer or any other suitable material. The shielding material may prevent failed induction and radio interference. In one embodiment, RFID signals can not pass from one side of the ring to the other (i.e. through the middle). In another embodiment, shielding material 720 and 760 are not necessary. Additionally, metal 730 and 750 can be of different material such as ceramic. In another embodiment, metal is replaced by ceramic and the shielding material is unnecessary. Various combinations of the above are also possible.

Figure 9:
FIG. 9 is a side view of the internal components of an embodiment of a wearable device.

In a version of the device, the transponders 710 and 770 are 0.13 mm thick slightly set into the inlay cover and passive RFID layer at the point of contact with the public transponder Chip 710 and the public transponder Chip 770 (in one embodiment, the public transponder chip 770 is an NTAG 203 Chip). In another embodiment, the transponder chip is an NTAG 216 or any other applicable chip. The Inlay cover may be an aesthetic colored layer designed to provide customization for the device. Referring briefly to FIG. 9, layers 910 and 920 may also be merged. In that case, instead of having a cover and a clear coat, a color pigment may be used in the clear coat. This method could save space. In this embodiment, an NT AG 216 chip may be used, but again, any other applicable chip such as the NTAG203 may be used. The inlay cover is either printed paper, a carbon fiber replica material or in some instances not required.

The Shielding 720 and 760 is 0.15 mm thick. The Metal 740 is 0.7 mm thick at the core and 1.5 mm thick on the outer rim of the device. The living being or void is >5 mm. The Metal 730 & 750 portion runs from the inside to the outside of the device between the two inlays 710 & 770. The living being is represented here as a human's finger because the device may be worn around the finger. The metal in this embodiment is represented by Titanium. However, ceramic aswell or another appropriate material may be used as an alternative to metal 730 and 750.

Figure 8:
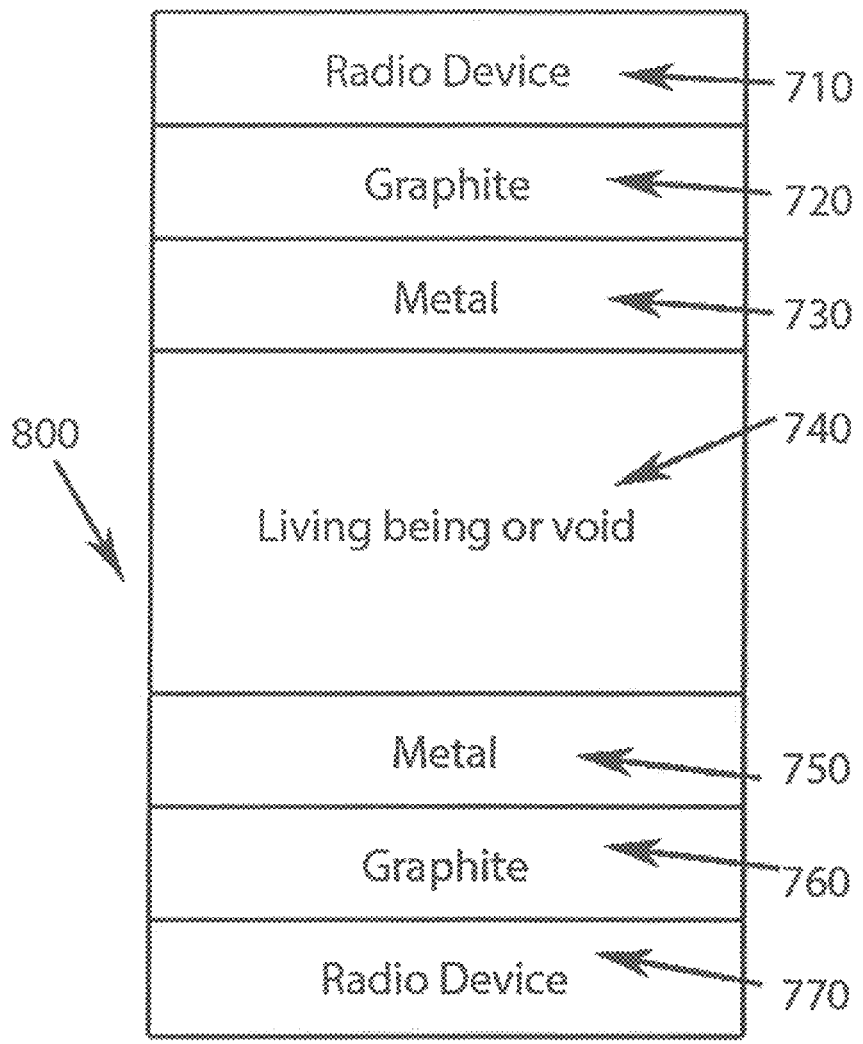
FIG. 8 is a side view illustration of an embodiment of internal components a wearable device in the form of a ring that communicates access data.

FIG. 8 is a side view illustration of one embodiment of internal components 800 of a wearable device in the form of a ring that communicates access data. In this example, the Public and Private Transponder 710 and 770 respectively are covered by a clear passive RFID material and also potentially an inlay cover. In a version of the device, the clear passive RFID layer is ~0.5 mm thick, the inlay cover another 0.5 mm, the transponders 710 and 770 are 0.13 mm thick slightly set into the inlay cover and passive RFID layer at the point of contact with the transponder Chip 710 & 770 (In this case an NTAG 203 chip). The Shielding 760 is 0.15 mm thick. The Metal 730 & 750 is 1 mm thick at the core and 1.5 mm thick on the outer rim of the device. The living being or void 740 is >5 mm. The Metal 730 and 750 portion runs from the inside to the outside of the device between the two inlays 710 & 770. The measurements above are merely an example for illustrative purpose. Other measurements are also possible.

FIG. 9 is a side view of the internal components of the device. In this example, the Public and Private Transponder 770 is covered by a clear passive RFID material 910 and also potentially an inlay cover 920. In a version of the device, the clear passive RFID material 910 is ~0.5 mm thick, the inlay cover another 0.5 mm, the transponders 770 are 0.13 mm thick slightly set into the inlay cover and passive RFID layer 910 at the point of contact with the transponder Chip (in this case an NTAG 203 Chip) 770. The Shielding/Reflective Material 760 is 0.15 mm thick. The Metal 730 is 1 mm thick at the core and 1.5 mm thick on the outer rim of the device. The living being or void is >5 mm. In this example, the metal portion 730 runs from the inside to the outside of the device between the two inlays 770 this portion is not exclusive to metal, other materials such as ceramics may be used. Once again, the measurements above are merely an example for illustrative purpose. Other measurements are also possible.

Figure 10:
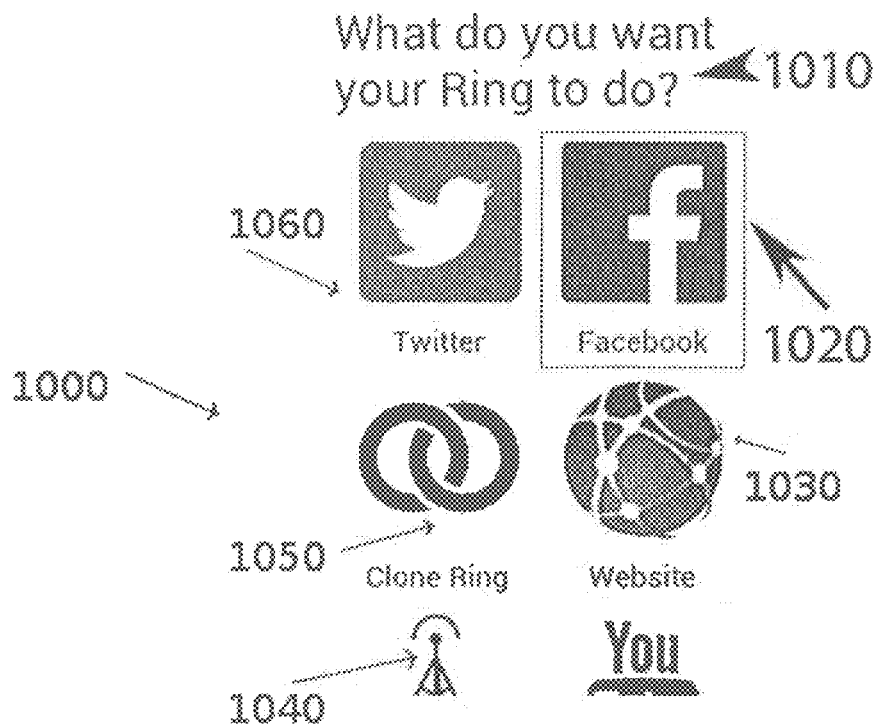
FIG. 10 illustrates the welcome screen of the mobile/tablet application in accordance with an embodiment of the present invention.
Figure 11:
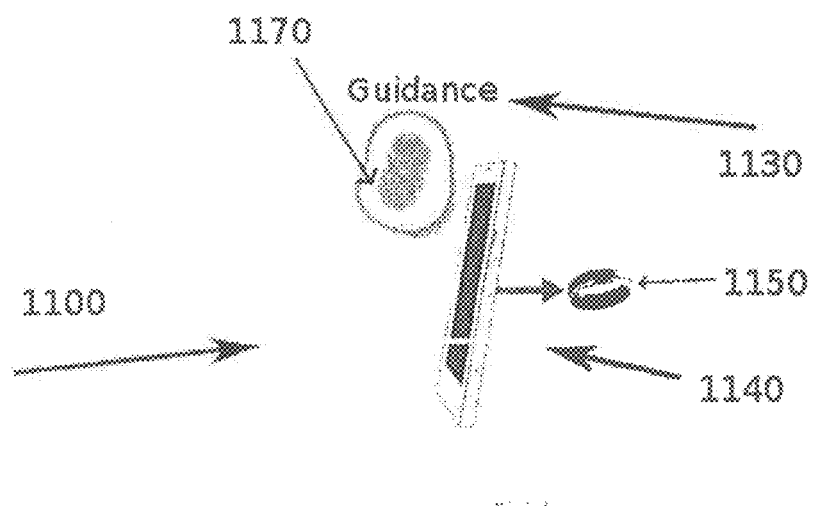
FIG. 11 illustrates the write screen of the mobile/tablet application in accordance with an embodiment of the present invention.

FIG. 10 illustrates the welcome screen of the mobile/tablet application 900. The write screen is used to write information or settings to the device. Screenshot 1000 illustrates action options of a cell phone and a tablet application used to read and write actions to the device. The device is capable of working with new radio enabled target devices and new software applications as they are made available. The write screen 1000 is user friendly and a display that includes a guidance 1010 such as "what do you want your ring to do." In the embodiment in FIG. 10, the available actions are facebook 1020, website 1030, etherpad 1040, clone ring 1050, and twitter 1060. In one example, the device is designed to work with the ISO 14443 Protocol which provides a standard for communicating between RFID enabled devices. If data has already been written to a ring, clone ring 1050 may be used to to copy the data from that ring to another ring. Referring briefly to FIG. 11, a sweet spot location representation is displayed as a heatmap 1170, the heatmap 1170 may be a colored visual representation that shows where a user can interact with the device 1140. By interacting with the location specified with the action the user will be interacting with the device 1040 sweet spot. The heatmap 1170 of the sweet spot location is displayed on the screen of the device 1140.

The guidance 1130 provides potential actions a user can write to the device 1140. For example, guidance 1130 may guide the user to hold the NFC Ring 1150 to the back of their device 1140 in a specific location 1170.

The mobile/tablet or other Smartphone/system ("system") with a processor and a memory is capable of communicating with a wearable device and configuration of the wearable device through a software application, programmable code, media such as a CDROM or a USB drive. The system may include an action generator that is configured to write a plurality of actions to a public transponder and a private transponder. The system may also include a scanning component that may operate on the action generator and be configured to scan a QR code (or other code) from a web application and write an action. The scanning component may write the actions to the wearable device.

FIG. 11 illustrates a write screen/how a device interacts with a target. Screenshot 1100 illustrating a prompt 1030 and device 1140 to the wearer to hold their device up to of the cell Phone and tablet application used to read and write actions to the device. Heatmap 1070 represents the sweet spot on the target device.

Figure 12:
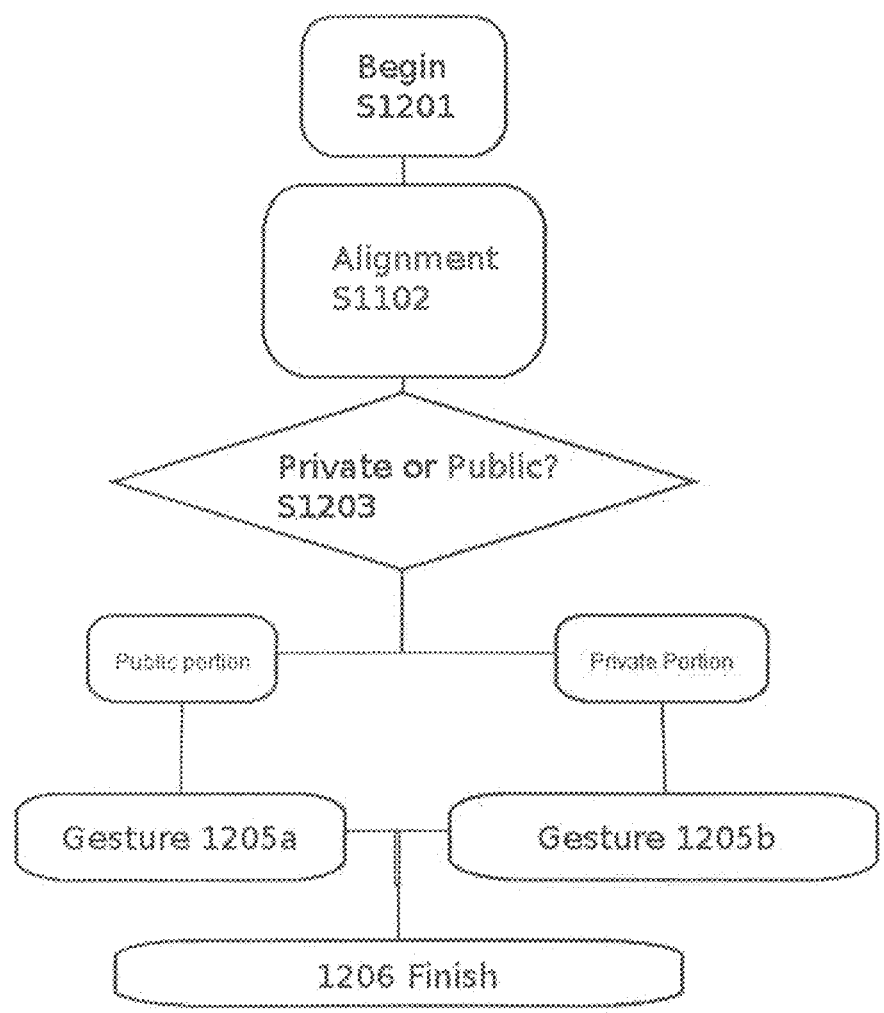
FIG. 12 illustrates how a wearer may interact with a target device in accordance with an embodiment of the present invention.

FIG. 12 illustrates an example of flow diagram of using a device (here, a ring). The process begins S1201 by the user wearing a ring in accordance with this disclosure. Next, at the alignment step S1202, the wearer aligns their ring with private portion to the base of his/her hand and the public portion to the top of his/her hand. Next, at step S1203, the wearer decides if the security action requires the private portion S1204*a* or the public portion S1204*b* of the device. If the public portion 1204*a* is required, the wearer moves to step S1205*a* and clinches/closes their fist. If the private portion 1204*b* is required, the wearer moves to step S1205*b* and opens their hand or exposes their palm. Finally, at step S206, the wearer moves the device to the target device and exposes the correct portion of the device to the target, i.e. either by clenching/closing their fist or an open hand gesture.

While various embodiments of the invention have been described, it will be apparent to those of ordinary skill in the art that many more embodiments and implementations are possible within the scope of the invention. Accordingly, the invention is not to be restricted.

The invention claimed is:

1. A wearable radio device comprising:
   a first transponder and a second transponder; and
   a barrier having a first portion and a second portion,
   wherein the first barrier portion is located between the first transponder and the second transponder in an inside portion of the device;
   wherein the second barrier portion is located between the first transponder and the second transponder in an outside portion of the device, and
   wherein the barrier extends from an inside surface of the device to an outside surface of the device.

2. The wearable device of claim 1 further comprising:
   shielding material;
   wherein the shielding material, the first transponder, and the second transponder are located in the inside portion of the device;
   wherein the shielding material is flexible graphite or polymer; and
   wherein the barrier is made of metal.

3. The wearable device of claim 1 wherein the first transponder is a public transponder and the second transponder is a private transponder.

4. The wearable device of claim 3 wherein a first hand gesture is used in combination with the public transponder and a second hand gesture is used with the private transponder.

5. An apparatus for access control comprising:
   a ring comprising:
      a private component and a public component;
      an RFID public transponder located inside the ring;
      an RFID private transponder located inside the ring;
      a barrier extending from inside the ring to outside the ring and having:
         an inner barrier portion located on an inner layer of the ring between the public transponder and the private transponder; and
         an outer barrier portion on an outside layer of the ring between the public transponder and the private transponder;
      a first hand gesture and a second hand gesture; and
      a digital lock;
         wherein the ring is configured to unlock the digital lock;
         wherein the first hand gesture is used for access to the public transponder and the second hand gesture is used for access to the private transponder.

6. The apparatus of claim 5 further comprising:
   flexible graphite or polymer shielding material located inside the ring;
      wherein the flexible graphite or polymer shielding material prevents failed induction and radio interference; and
      wherein the barrier is made of either ceramics or metal.

7. The apparatus of claim 5 wherein the digital lock is NFC enabled.

8. The apparatus of claim 7 wherein the public transponder and the private transponder are covered by an inlay cover.

9. The apparatus of claim 8 wherein the digital lock further comprises:
   a sweet spot.

10. The apparatus of claim 8 wherein the public transponder and the private transponder are NTAG 203 chips.

11. The apparatus of claim 8 wherein the public transponder and the private transponder are NTAG 216 chips.

12. The apparatus of claim 9 wherein the digital lock is within touch distance from the wearable device.

13. The apparatus of claim 12 wherein the RFID public transponder and the RFID private transponder comprise ISO14443A standard and operate at a frequency of 13.56 Mhz.

14. A ring for access control comprising:
a first transponder and a second transponder; and
a barrier having a first portion and a second portion,
wherein the first barrier portion is located between the first transponder and the second transponder on an inner layer of the ring;
wherein the second barrier portion is located between the first transponder and the second transponder on an outside layer of the ring, and
wherein the barrier extends from inside the ring to outside the ring.

* * * * *